United States Patent [19]

Brennecke et al.

[11] Patent Number: 4,928,255
[45] Date of Patent: May 22, 1990

[54] METHOD AND APPARATUS FOR EXPLOSION PROTECTION OF PLANTS, PIPELINES AND THE LIKE BY PRESSURE MONITORING

[75] Inventors: Hermann Brennecke, Darmstadt; Horst Liere, Eppertshausen; Reinhold Koch, Bad Konig, all of Fed. Rep. of Germany

[73] Assignee: IRS Industrie Rationalisierungs Systeme GmbH, Darmstadt, Fed. Rep. of Germany

[21] Appl. No.: 352,667

[22] Filed: May 9, 1989

Related U.S. Application Data

[63] Continuation of Ser. No. 20,000, Feb. 27, 1987, abandoned.

[30] Foreign Application Priority Data

Mar. 5, 1986 [DE] Fed. Rep. of Germany ....... 3607141

[51] Int. Cl.$^5$ ...................... G08B 17/00; G06F 11/30
[52] U.S. Cl. ..................................... 364/558; 364/550; 73/37; 340/577; 340/611; 340/626
[58] Field of Search ............... 364/509, 505, 138, 550, 364/551.01, 558; 73/36, 37, 37.8, 46, 49.1, 49.4; 340/577, 578, 588, 611, 614, 626, 288; 250/554

[56] References Cited

U.S. PATENT DOCUMENTS

| | | | |
|---|---|---|---|
| 3,875,388 | 4/1975 | Somerville et al. | 364/575 X |
| 4,054,786 | 10/1977 | Vincent | 364/575 |
| 4,124,840 | 11/1978 | Kobayhashi | 364/550 X |
| 4,144,578 | 3/1979 | Mueller et al. | 364/575 |
| 4,161,782 | 7/1979 | McCracken | 364/138 X |
| 4,184,205 | 1/1980 | Morrow | 364/550 X |
| 4,249,186 | 2/1981 | Edwards | 364/550 X |
| 4,458,323 | 7/1984 | Willis et al. | 364/575 X |
| 4,583,597 | 4/1986 | Spector et al. | 340/578 X |
| 4,584,654 | 4/1986 | Crane | 364/550 |
| 4,654,643 | 3/1987 | Meisenheimer, Jr. | 340/614 X |
| 4,675,834 | 6/1987 | Furuse | 364/558 |
| 4,686,633 | 8/1987 | Furuse | 364/558 |
| 4,720,807 | 1/1988 | Ferran et al. | 364/558 |
| 4,727,359 | 2/1988 | Yuchi et al. | 340/588 X |
| 4,736,329 | 4/1988 | Ferretti et al. | 364/575 X |
| 4,755,687 | 7/1988 | Akiba et al. | 250/554 |
| 4,796,205 | 1/1989 | Ishii et al. | 364/550 |
| 4,819,733 | 4/1989 | Aria et al. | 250/554 X |

Primary Examiner—Parshotam S. Lall
Assistant Examiner—Joseph L. Dixon
Attorney, Agent, or Firm—Edwin E. Greigg

[57] ABSTRACT

The invention discloses a method and an apparatus for explosion protection of plants, pipelines and the like by monitoring chronologically successive values of the system pressure in the potentially explosive area and by comparing these values with a predetermined pressure threshold, where the exceeding of this pressure threshold is used as a triggering criterion for initiating explosion protection provisions. According to the invention, instead of predetermining a constant value as the pressure threshold, the pressure threshold is updated continuously in accordance with the system pressure prevailing at that time. As a result, the pressure threshold can be set with a smaller safety margin above the system pressure than before. Brightness and temperature thresholds may also be used singly, or together with pressure in any combination in continuous value monitoring.

27 Claims, 2 Drawing Sheets

METHOD AND APPARATUS FOR EXPLOSION PROTECTION OF PLANTS, PIPELINES AND THE LIKE BY PRESSURE MONITORING

This is a continuation of copending application Ser. No. 020,000 filed Feb. 27, 1987 now abandoned.

BACKGROUND OF THE INVENTION

The invention relates to a method for explosion protection of plants, pipelines and the like by monitoring chronologically successive values of the system pressure in potentially explosive areas and comparing these values with a predetermined pressure threshold, which is located above the system pressure prevailing at normal operating conditions by a certain safety margin; if this pressure threshold is exceeded certain explosion protection provisions, in particular isolating the explosion site behind a bulkhead and supplying extinguishing agents, are triggered. The invention also relates to an apparatus for performing this method.

In explosion protected plants it is known to monitor the course of pressure in the potentially explosive areas of the plant and if predetermined threshold values are exceeded to trigger explosion suppression by supplying extinguishing agents, flame arresters, bulkhead insulation and the like.

On the one hand, in principle, the goal of these explosion protection systems is to set the pres sure threshold that is effective for the triggering procedure only slightly above the normally prevailing system pressure, so that a potential explosion is recognized as soon as possible. On the other hand, however, the system pressure is subject to unavoidable fluctuations, whether from startup or shutdown procedures, from the opening of seals or valves, from changes in atmospheric pressure, or other causes. These harmless pressure fluctuations ought not to lead to triggering because each triggering results in interruptions in operation, and depending upon the kind of extinguishing agents used the plant must be thoroughly cleaned before it can be started up again.

Accordingly, the pressure threshold at which the explosion protection provisions are triggered has to be set a certain safety margin above the typically prevailing system pressure. Depending on the operating parameters, this safety margin is at least 100 to 200 mbar. This is true even if not only the static pressure level but also the speed of pressure change are monitored simultaneously.

As a result, the known plants can sufficiently reliably distinguish between dangerous and non-dangerous pressure increases. However, the fact that plant response is delayed by this safety margin means that in the case of danger a greater portion of the plant is affected by the explosion-caused pressure increase, and these parts of the plant must be able to bear a higher pressure load, and thus must be built correspondingly more sturdily and expensively as a result.

OBJECT AND SUMMARY OF THE INVENTION

Based on the above considerations, it is the principal object of the present invention to improve upon the known explosion monitoring system in terms of the precision with which it responds. That is, the system should be able to recognize earlier than before whether a given pressure increase is harmless variation from the norm or indicative of an impending dangerous situation.

This object is attained in accordance with the invention in that at least some of the chronologically successive pressure values are stored in memory, that a series of the stored pressure values extending over a time interval of at least 30 milliseconds is used for determining a mean pressure value, that the pre-set safety margin is added to this mean value for determining a new pressure threshold and this correction is repeated continuously, with older pressure values being replaced by newer pressure values, this continuously updating the pressure threshold.

By means of the monitoring system according to the invention, the pressure threshold that is effective for the triggering procedure is continuously adapted to any changes that occur in the system pressure. The safety margin, which formerly had to be dimensioned in accordance with the greatest possible pressure increase to be expected during operation, can accordingly be reduced to a fraction of the former value. As a result, a pressure increase caused by an impending explosion can be recognized earlier (after only about half as long as before); the propagation of the pressure front is limited to a smaller area of the plant; and the maximum pressure increase value and the pressure load that greater parts of the plant must bear can be set significantly lower. A plant protected in accordance with the invention is therefore easier and less expensive to build.

Monitoring as provided by the invention is also distinguished by greater protection against false triggering. For example, if a disruption in the course of operation causes an unforeseen sharp increase in pressure then in the known system this would needlessly trigger the supply of extinguishing agents. This is precluded in this invention by the on-going follow-up of the pressure threshold as a function of the actual system pressure.

To assure that in the event of a pressure rise caused by an explosion the pressure threshold will not rise as well to such a extent that triggering will no longer occur, the mean value is formed using pressure values from a time interval that is substantially longer than the time interval that is associated with an explosion-caused pressure increase. As a result, the updated pressure threshold always follows up the actual system pressure with a certain retardation, so that an explosion-dictated pressure rise either does not cause any further increase in the pressure threshold at all, or does so only s late that it is exceeded in any case in the event of an explosion-dictated pressure rise; in other words, the criterion for triggering, which is that the threshold is exceeded, is met.

The time interval responsible for this from which the pressure values for forming the mean value are drawn, is highly plant-specific; that is, it depends not only on the explosive media and their mixture ratio, as well as on the explosion volume, but also on the starting pressure and starting temperature in the plant.

It is therefore recommended that the time interval from which the pressure values for forming the mean value are drawn be amenable to variation.

If a very steep pressure rise is to be expected in the event of an explosion, because of the specific parameters of the plant, then short time intervals of 20 to 100 milliseconds can be used, while with average pressure increase speeds the time interval must be selected to be longer, approximately 100 to 500 milliseconds. From the standpoint of safety, there is no formal upper limit to the time interval; however, the quality of the data produced during the updating decreases as the time interval increases, and the time saved upon triggering decreases correspondingly as well. Thus, as a general rule, the upper limit is therefore selected at between 2 and 5 seconds.

In general, the measurement of the system pressure is performed at intervals on the order of a millisecond. For forming a mean value, it is then sufficient to sample only about every 5th to 200th value, in particular every 10th to 100th value. A smaller memory capacity is then adequate.

A particularly advantageous method for updating the pressure threshold in accordance with the system pressure prevailing at that time is disclosed herein. In that embodiment instead of using a series of numerous pressure values stored in memory to determine the mean or intermediate value, only the most recently measured pressure value is stored and then combined with a pressure value measured later to form an intermediate value; the above-mentioned safety margin is then added to this intermediate value to determine the corrected pressure threshold. This correction is repeated continuously for updating the pressure threshold, with the option of choosing each new measured value or only every second, fifth or later measured value for determining a new intermediate value. Here again, the more frequently the intermediate values are determined, in other words the more up-to-date they are then the smaller the selected safety margin can be. The substantial advantage of updating in this way is that virtually no memory capacity is required, and the calculation is done much faster.

As in the case of the first method described above, in which a mean value is formed from a series of measured values, here again linking the old intermediate value to the newly measured pressure value to determine a new, more up-to-date intermediate value can be done in various ways. For instance, an arithmetic or integral mean value formation can be performed; alternatively, the new measured value can be weighted more heavily than the old value that is to be corrected, especially if the mean value is determined from a great number of measured values stored in memory. Contrarily, if the updating is performed as in the embodiment referred to above, then it is recommended that the old intermediate value be weighted more heavily than the new measured value, so that an explosion-dictated pressure increase is still recognized as such. In that case, the formula $$\frac{n-1}{n} \cdot ZW + \frac{1}{n} NW,$$

where ZW is the old intermediate value, NW is the new parameter value measured later, and $n \geq 2$, in particular 2 to 100 can be used.

A further improvement of the response sensitivity can be attained in accordance with the invention in that in addition to monitoring the threshold, the second derivative of the chronological pressure course, or a variable proportional thereto, is monitored and compared with a predetermined value, and that the triggering occurs only if both this value and the predetermined pressure threshold are exceeded.

Utilizing the second derivative as well has the advantage that the trend of the course of pressure over time (in a mathematical sense, the curvature of the pressure curve plotted over time) becomes recognizable. If the resultant value for this is zero or is negative, for example, then even a major increase in the system pressure over the predetermined pressure threshold can be tolerated. Tests performed by the applicant have in fact shown that an explosion-dictated pressure increase at the level of the predetermined pressure threshold absolutely takes place with progressively increasing pressure as a function of time. If this progressivity does not exist, or no longer exists, when the predetermined threshold is exceeded, then the pressure rise is due to other, non-dangerous causes and triggering of explosion protection provisions is unnecessary.

At the same time, the response sensitivity is improved once again thereby, because the criterion for triggering by which the second derivative of the chronological pressure course must exceed a certain value is already met at the beginning of the pressure curve, where it still has a relatively flat rise. If the rise of the pressure curve were used as a triggering criterion instead, then it would not be possible to recognize a dangerous situation until a much later time.

As an apparatus for performing the pressure updating, an adaptation unit that has a memory for the system pressure signals, a control unit for selecting the signals to be stored, and a means for forming mean values is sufficient. This adaptation unit is suitably a program-controlled microprocessor. The output of the adaptation unit is sent to an adding or multiplying unit, depending upon whether the safety margin is to be added to the calculated mean value by addition or by multiplication.

If monitoring of the second derivative of the chronological pressure course or of a variable proportional thereto is additionally used, then it is recommended that the known evaluation unit be augmented with a differentiator, the output of which is connected to a comparator at which the predetermined value is present, that the output of this comparator is connected to an AND element, which is connected at the other end to the output of a further comparator unit at which the signals representing the system pressure and the predetermined pressure threshold therefor are present, while the output of this AND element is connected to the triggering mechanism.

This evaluation unit suitably includes an analog/digital converter and a program-controlled microprocessor.

The differentiator can be constructed at a particularly favorable cost if it comprises a difference former and a memory, and the difference former initially determines the signal difference $\Delta p_n = p_2 - p_1$ from successive pressure signals $p_1$, $p_2$ and then determines the difference between successive signal differences $\Delta p_n - \Delta p_{n-1}$. That is, instead of a mathematical second derivation, only a double difference formation is performed, which because of the constant time intervals between the individual pressure values is directly proportional to the second derivative.

The predetermined comparison value for the second derivative or for the variable proportional thereto can be set to zero or a positive value. This is also dependent on the aforementioned explosion parameters.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
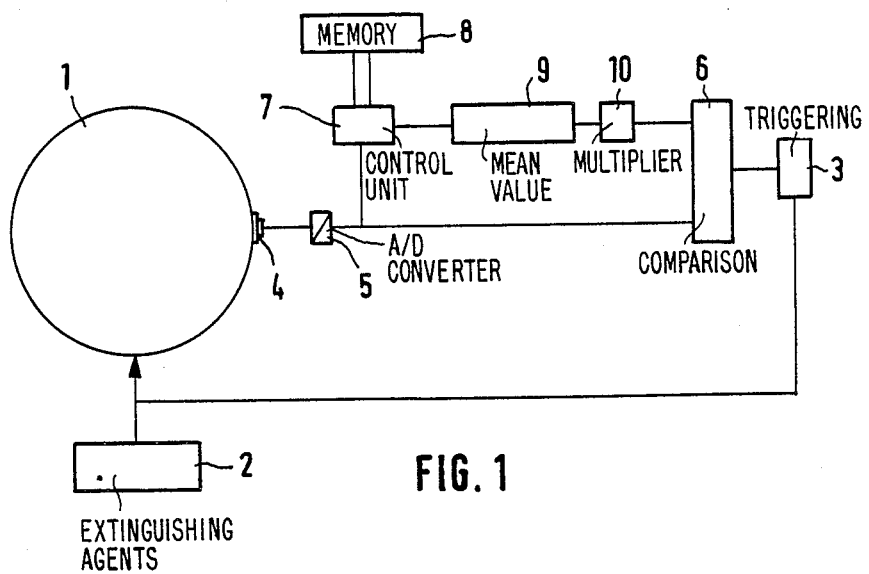
FIG. 1 is a schematic illustration of the monitoring apparatus.

In FIG. 1, the potentially explosive area of a plant is shown in the form of a pressure vessel 1. Connected to it in a known manner is a supply tank 2 of extinguishing agents, the supply of extinguishing agents being controlled by a triggering unit 3. The triggering unit 3 can also insulate the pressure vessel 1 in a known manner by mean of barrier flaps in its inflow and return lines and can trigger other protective provisions as needed.

Mounted on the pressure vessel 1 is a pressure sensor 4 the signals of which are supplied via an analog/digital converter 5 to a comparison unit 6 and are there compared with a pressure threshold that is present at the other input of the comparison unit. If this pressure threshold is exceeded by the vessel pressure then the usual protective provisions are initiated by activation of the triggering unit 3.

An essential feature is that the pressure threshold present at the comparison unit 6 is not constant but instead is continuously followed up as a function of the pressure prevailing in the vessel 1. To this end, a second output of the analog/digital converter 5 is connected to a control unit 7. The control unit 7 selects some signals from the arriving pressure signals, which succeed one another at the shortest possible time intervals, in practice at intervals of 10 approximately one milli-second. Depending upon operating conditions it is sufficient for a pressure value to be selected and delivered to the memory 8 only every 10 to 100 milliseconds. The memory capacity is dimensioned such that at least five pressure values, but preferably considerably more, can be stored; this storage is performed such that when a new pressure value is entered, the oldest pressure value in the memory is erased.

At the same rate as that with which the memory 8 is supplied with new pressure values the control unit 7 provides that the instantaneously stored values are supplied to a means for forming mean values 9, which calculates a mean value from the stored pressure values. This mean value is increased by an adjustable safety margin in an adding or multiplying element 10 and is then supplied as a reference variable to the comparison unit 6.

Figure 2:
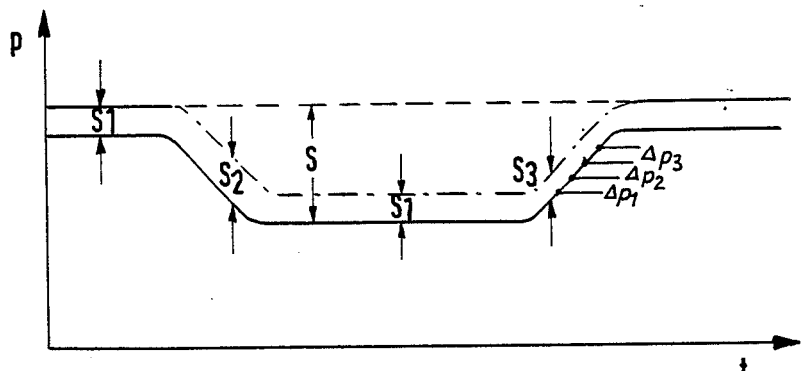
FIG. 2 shows the course of the pressure when the monitoring apparatus of FIG. 1 is used, in comparison with the prior art.

The influence of this monitoring apparatus on the course of the pressure value is shown in FIG. 2. Solid lines indicate the course of the system pressure established in the pressure vessel 1 at startup and shutdown. If a constant threshold value is used as in the prior art, then this threshold must be located above the maximum pressure peaks to be expected during operation, and for safety reasons an additional safety margin $S_1$ of at least 100 mbar should be adhered to. In the prior art, the course of the pressure threshold is thus as shown by the horizontal broken line. As the diagram shows, the safety margin is approximately four times as high as necessary in comparison with the lowered system pressure that prevails during operation. Thus an explosion-caused pressure increase is not recognizable until this unnecessarily high pressure difference has been exceeded.

By comparison, adapting the pressure threshold continuously to the currently, prevailing system pressure as provided by the invention leads to a lowering of the pressure threshold during startup of the plant and an increase in the pressure threshold during shutdown, as clearly indicated by the dot-dash curve. Although the pressure threshold follows up the current pressure course with a certain retardation, this retardation is relatively slight, and it makes itself apparent only during the startup and shutdown. Thus, the safety margin $S_2$ during startup increases by 10 to 20%, while during shutdown it decreases correspondingly as shown by the curve $S_3$. While the system pressure is at the operational level, the safety margin $S_1$ remains unchanged. The high response sensitivity of the system according to the invention is accordingly independent of fluctuations in the system pressure.

Regardless of this, updating the pressure threshold makes it possible to operate with a smaller safety margin than before. The fundamental result is that the triggering time is shorter than in th prior art.

This is particularly true if, as a further feature of the invention provides, not only the absolute pressure in the vessel 1 but its course over time and in particular its second derivative is monitored and use as a second criterion in addition to the absolute pressure. The monitoring apparatus for this is shown schematically in FIG. 3. Following the pressure sensor 4 and the analog/digital converter 5, it has a microprocessor 11, which in turn is connected to the triggering unit 3. In a known manner, the microprocessor 11 includes a quartz-controlled clock generator and on the basis of the chronologically successive pressure signals $p_1$, $p_2$, etc., which generally arrive at intervals of a millisecond, it calculates the signal difference $\Delta p_n = p_2 - p_1$ and then calculates the difference between successive signal differences $\Delta p_n - \Delta p_{n-1}$. This last value, because of the constant time interval between successive pressure signals, is directly proportional to the second derivative of the chronological pressure course in the pressure vessel 1.

The triggering takes place, however, whenever not only is the second derivative, or the variable proportional to it, above a predetermined value, but the pressure threshold has simultaneously been exceeded as well. Both triggering criteria can be processed in the 10 same monitoring unit. The electronic components 6–10 shown in FIG. 1 can naturally be replaced by a microprocessor, which also performs the calculation of the second derivative.

Figure 4:
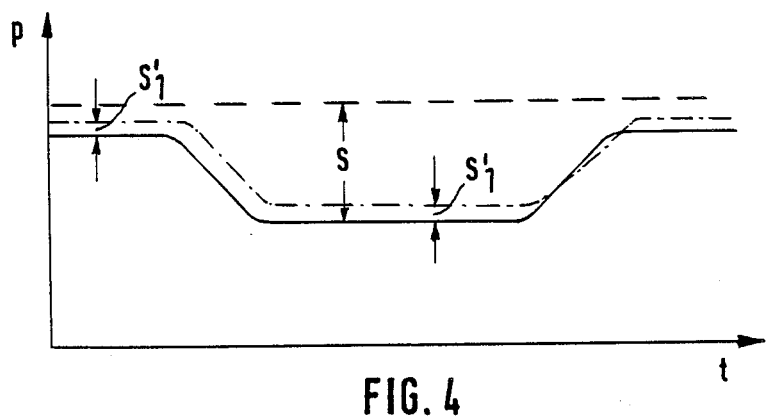
FIG. 4 shows the course of the pressure threshold when the apparatus of FIG. 3 is used.

The influence of a combined monitoring of this kind on the course of the threshold value is shown in FIG. 4. It is apparent that in this case the pressure threshold represented by dot-dash lines can be guided with an even smaller safety margin with respect to the current system pressure, and that it can even be exceeded over wide intervals by the system pressure without triggering taking place. This is because by monitoring the second derivative, the exceeding of the pressure threshold during shutdown of the plant is recognized as non-dangerous, because in contrast to an explosion-caused increase the second derivative is below a predetermined positive variable; in the exemplary embodiment, it is even at zero.

Because of the slight safety margin, the combined monitoring apparatus is distinguished by still further shortening of its response time. The areas of the plant encompassed by the potential pressure wave are thus made still smaller, and the pressure load they must bear is reduced.

It will be understood that the scope of the invention also encompasses combining the updating of the pressure threshold with the monitoring of the first derivative of the chronological pressure course. As a rule, however, a greater response speed can be attained by using the second derivative.

It is also within the scope of the invention to perform the explosion protection not by monitoring the system pressure but rather by monitoring the brightness in the potentially explosive area. That is, the intensity of the luminous radiation is measured; the infrared, ultraviolet or other wave spectrum may also be used.

It is also within the scope of the invention to monitor the temperature, instead of the pressure, in the potentially explosive areas.

In these variants, the temperature or brightness values are processed as described above and used for triggering the explosion protection provisions. A combination of pressure and brightness monitoring, or pressure and temperature monitoring, or brightness and temperature monitoring, is also possible.

Figure 3:
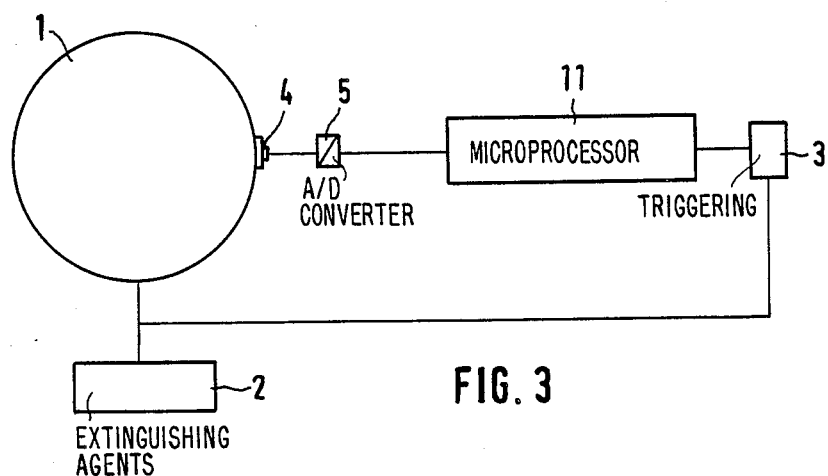
FIG. 3 is a schematic illustration of an augmented monitoring apparatus.

In the exemplary embodiments of FIGS. 1 and 3, only one pressure sensor is shown for the sake of simplicity. In practice, a plurality of sensors are often connected in parallel to one another and connected to a common triggering unit 3. In that case, it is recommended that each sensor have its own microprocessor 11, and that the microprocessors be connected to a common central triggering unit 3. It is particularly suitable if the triggering unit 3 is combined with a control unit at which the pressure threshold, brightness threshold and/or temperature threshold, the safety margin, and optionally other parameters as well can be set for all the sensor and microprocessors simultaneously.

The foregoing relates to a preferred exemplary embodiment of the invention it being understood that other variants and embodiments thereof are possible within the spirit and scope of the invention, the latter being defined by the appended claims.

What is claimed and desired to be secured by Letters Patent of the United States is:

1. A method for automatically controlling a system for automatically initiating protective measures for protecting plant facilities, pipelines and the like from fire or an explosion wherein a system parameter reference value is continuously updated to a value which is higher than a currently prevailing mean system parameter value by a safety margin, said method comprising the steps of:
    monitoring successive system parameter values in potentially explosive areas;
    storing at least some of the successive system parameter values in a memory;
    using a series of the stored successive system parameter values obtained over a time interval to determine a means system parameter value;
    incrementing said mean system parameter value by said safety margin to define a reference variable;
    comparing said monitored successive system parameter values with said reference variable;
    continuing the above steps, with the oldest successive system parameter value stored in memory being replaced in said memory by a newer current successive system parameter value to continuously update said mean system parameter value and said reference variable; and
    upon said monitored system parameter value exceeding the reference variable, activating a triggering unit to produce a signal which is conducted to a control means for automatically initiating said protective measures.

2. The method defined by claim 1, further wherein said time interval for forming the mean parameter value is chosen from a range of a minimum of 30 milliseconds, preferably 100 milliseconds, to a maximum of 10 seconds, preferably 5 seconds.

3. The method defined by claim 2, further wherein said step of monitoring values of said system parameter occurs at a time interval on the order of one millisecond and at least every 100th to 200th value and at most every 5th to 10th value is stored in said memory.

4. The method defined by claim 1, further wherein said step of monitoring values of said system parameter occurs at a time interval on the order of one millisecond and at least every 100th to 200th value and at most every 5th to 10th value is stored in said memory.

5. The method defined by claim 1, further comprising the step of updating the reference variable for so long as a first derivative of a curve comprised of said successively measured parameter values is below said predetermined parameter threshold value.

6. The method as defined by claim 5, further comprising the additional steps of determining the first derivative of a curve representing successively measured parameter values or a variable proportional thereto and comparing said first derivative with a predetermined value, and further wherein said step of triggering a signal occurs only when both the predetermined value and the predetermined parameter threshold are exceeded.

7. The method defined by claim 1, further comprising the step of updating the reference variable for so long as a second derivative of a curve comprised of said successively measured parameter values is below said predetermined parameter threshold value.

8. The method defined by claim 7, further comprising the step of determining the second derivative of said curve representing said successively measured parameter values or a variable proportional thereto to obtain a test value, comparing said test value with a predetermined test value, and only triggering said signal if the test value and said predetermined system parameter threshold value are exceeded.

9. The method defined by claim 1 further wherein said parameter being monitored is pressure.

10. A method as defined by claim 1, further wherein said parameter being monitored is brightness intensity.

11. A method as defined by claim 1, further wherein said parameter being monitored is temperature.

12. A method for automatically controlling a system for automatically initiating protective measures for protecting plant facilities, pipelines and the like from a fire or an explosion wherein a system parameter threshold value is continuously updated to a value which is higher than a prevailing intermediate system parameter value by a safety margin, said method comprising the steps of:
    monitoring successive system parameter values in potentially explosive areas;
    storing one of the successive system parameter values in memory;
    using said stored successive system parameter value an a later successive system parameter value measured subsequently to form an intermediate system parameter value;

incrementing said intermediate system parameter value by said safety margin to determine said system parameter threshold value;

continuously repeating the above steps with the stored successive system parameter value being replaced by a more recent system parameter value and continuously updating the intermediate system parameter value and the system parameter threshold value; and upon said monitored system parameter value exceeding the system parameter threshold value, activating a triggering unit to produce a signal which is conducted to a control means for automatically initiating said protective measures.

13. A method as defined by claim 12, further wherein the step of forming the intermediate value is effected in accordance with the formula $$\frac{n-1}{n} \cdot ZW + \frac{1}{n} NW$$

where ZW is the old intermediate value, NW is the new parameter value measured later, and $n \geq 2$, in particular 2 to 100.

14. A method as defined by claim 12, further wherein said parameter being monitored is pressure.

15. A method as defined by claim 12, further wherein said parameter being monitored is brightness intensity.

16. A method as defined by claim 12, further wherein said parameter being monitored is temperature.

17. An automatic system for automatically coping with an emergency situation in plant facilities, pipelines and the like wherein a system reference variable is continuously updated to a value which is higher than a prevailing means system parameter value by a safety margin, said system comprising:

sensor means for monitoring successive system parameter values of said system in selected areas, said sensor means being connected to an analog/digital converter arranged to supply signals representing said monitored system parameter values to a control unit and to a comparison means, said control unit supplying at least some of said system parameter values to a memory means for retention in memory and further supplying the monitored system parameter values fed to said memory means to a mean value forming means for calculating a mean value from values fed thereto over a time interval, said means value forming means being connected to a means value incrementing means arranged to increase each said means value supplied to it by said safety margin to create a reference variable, said mean value incrementing means being arranged to supply said reference variable to said comparison means for comparison with said monitored successive system parameter values, said comparison means sending a trigger signal to a triggering means to activate said triggering means upon a monitored system parameter value exceeding said reference variable, and said triggering means automatically producing a signal which is directed to said means for initiating protective provisions for coping with said emergency situation.

18. An apparatus as defined by claim 17, further wherein said comparison means, said control means, said memory, said means for forming mean values, and said mean value incrementing means are comprised by a microprocessor arranged to provide said selectable safety margin.

19. An apparatus as defined by claim 17, further wherein said monitoring means comprises at least one parameter sensor disposed near a potential explosion site and adapted to generate a parameter dependent signal and further to supply said signal to an evaluation unit, said evaluation unit including differentiator means for determining second derivative values of a curve representing successive parameter values, said differentiator means being connected to a first comparator to supply said second derivative values thereto, said further predetermined value being provided to said comparator, an output of the first comparator being connected to an AND element said AND element being further connected to an output of a second comparator to which signals representing said second derivatives of said successive values and the predetermined parameter threshold are supplied, and the output of the AND element is connected to said triggering means.

20. An apparatus as defined by claim 17, further wherein the evaluation unit is a program-controlled microprocessor which is connected via said analog/digital converter to the parameter sensor.

21. An apparatus as defined by claim 17, further wherein the differentiator means comprises a difference former and a memory, the difference former initially determining a signal difference $(\Delta p_n = p_2 - p_1)$ from successive parameter signals ($p_1$, $p_2$) and then determining the difference between successive signal differences $(\Delta p_n - \Delta p_{n-1})$.

22. An apparatus as defined by claim 17, further wherein a predetermined comparison value for the second derivative of said curve of successive parameter values or for the variable proportional thereto is at least set to zero.

23. An apparatus as defined by claim 17, further wherein said parameter being monitored comprises brightness intensity and said parameter sensor comprises a photosensitive element.

24. An apparatus as defined by claim 17, further wherein said parameter being monitored is temperature and said parameter sensor comprises a temperature sensor.

25. An apparatus as defined by claim, 17, further wherein said parameter being monitored is pressure.

26. An apparatus as defined by claim 17, further wherein each sensor is provided with its own microprocessor.

27. An apparatus as defined by claim 17, further wherein the microprocessors are connected to a central triggering unit at which the operative parameter system being monitored, the safety margin and other functions can be centrally predetermined for all the microprocessors.

* * * * *

UNITED STATES PATENT AND TRADEMARK OFFICE
CERTIFICATE OF CORRECTION

PATENT NO.  :  4,928,255

DATED       :  May 22, 1990

INVENTOR(S) :  Hermann BRENNECKE et al

It is certified that error appears in the above-identified patent and that said Letters Patent is hereby corrected as shown below:

```
Column 2, line 10, "this" should be --thus-- line 47, "s" should be --so--

Column 5, line 35, delete "10"

Column 6, line 21, "th" should be --the-- line 25, "use" should be --used-- line 46, delete "10"

Column 7, line 58, "means" should be --mean--

Column 9, line 35, "means" should be --mean-- line 49, "means" should be --mean--
                  (first occurrence)

line 50, "means" should be --mean-- line 51, "means" should be --mean--
```

UNITED STATES PATENT AND TRADEMARK OFFICE
CERTIFICATE OF CORRECTION

PATENT NO. : 4,928,255

DATED : May 22, 1990

INVENTOR(S) : Hermann BRENNECKE et al

It is certified that error appears in the above-identified patent and that said Letters Patent is hereby corrected as shown below:

Column 10, line 29, delete "-" (at end)

Signed and Sealed this

Twelfth Day of November, 1991

*Attest:*

HARRY F. MANBECK, JR.

*Attesting Officer*     *Commissioner of Patents and Trademarks*